United States Patent [19]

Gantenbrink et al.

[11] Patent Number: 4,552,437

[45] Date of Patent: Nov. 12, 1985

[54] INTERNAL MASKING LAYER TO PREVENT PARALLAX IN AN ELECTRO-OPTICAL DISPLAY OR INDICATOR UNIT

[75] Inventors: Karl Gantenbrink, Karlsruhe; Peter Knoll, Ettlingen; Peter Rapps, Karlsruhe, all of Fed. Rep. of Germany

[73] Assignee: Robert Bosch GmbH, Stuttgart, Fed. Rep. of Germany

[21] Appl. No.: 539,700

[22] Filed: Oct. 7, 1983

[30] Foreign Application Priority Data

Oct. 8, 1982 [DE] Fed. Rep. of Germany ....... 3237323

[51] Int. Cl.[4] .............................................. G02F 1/13
[52] U.S. Cl. ............................ 350/339 R; 350/339 F; 350/341
[58] Field of Search ............... 350/339 R, 339 F, 344, 350/338, 341

[56] References Cited

U.S. PATENT DOCUMENTS

| | | | |
|---|---|---|---|
| 3,736,047 | 5/1973 | Gelber et al. | 350/339 R X |
| 3,840,695 | 10/1974 | Fischer | 350/339 F |
| 4,006,968 | 2/1977 | Ernstoff et al. | 350/339 F |
| 4,097,131 | 6/1978 | Nishiyama | 350/338 |
| 4,376,934 | 3/1983 | Prohaska et al. | 350/344 X |

FOREIGN PATENT DOCUMENTS

| | | | |
|---|---|---|---|
| 0023421 | 2/1981 | European Pat. Off. | 350/339 F |
| 56-25174 | 3/1981 | Japan | 350/339 F |
| 1336254 | 11/1973 | United Kingdom | 350/344 |

*Primary Examiner*—John K. Corbin
*Assistant Examiner*—Richard F. Gallivan
*Attorney, Agent, or Firm*—Frishauf, Holtz, Goodman & Woodward

[57] ABSTRACT

To prevent parallax distortion, and to simplify application of masking patterns, particularly for LCD units, the mask is applied to the front-, or back-plate electrode at the side facing the liquid crystal, and opposite the interrupted, or etched front-plate electrode on the back support plate. Suitable methods are printing, particularly with a coarse or rough grain lacquer varnish or ink, the projections of the coarse grain forming the microspacers between said plates and for retaining the liquid crystal medium; other methods are galvanic deposition on the continuous electrode, and selected exposure of photographic emulsions, particularly color emulsions so that, with multi-color emulsions, multi-color effects can be obtained although only a single thickness of emulsion layer is applied.

4 Claims, 1 Drawing Figure

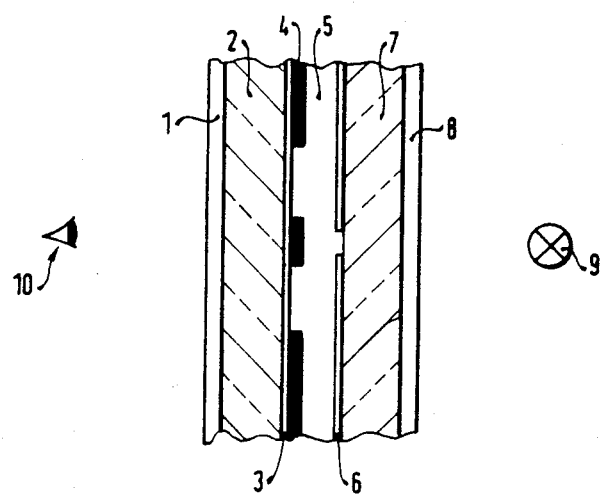

INTERNAL MASKING LAYER TO PREVENT PARALLAX IN AN ELECTRO-OPTICAL DISPLAY OR INDICATOR UNIT

The present invention relates to an electrooptical display or indicator unit having a display or indicator panel, particularly adapted for liquid crystal display (LCD) panels.

BACKGROUND

In many types of display units it is desirable to provide masking of those zones of the panel of the unit which does not contain information content, or to provide masking of selected zones to obtain special effects. Masking of display zones which do not contain information, as previously proposed, was done by applying external masks to the display panels. In case of LCD units, the masks are applied to the outer glass or front polarizer surface. The minimum thickness of the glasses which retain the liquid crystal cannot be passed. It is thus difficult to apply masking which is precisely aligned with LCD panels, and in which reading is completely free of parallax. Applying masking to the outside requires additional manufacturing steps, which increases the cost of the display unit.

THE INVENTION

It is an object to provide a display unit with a panel which can be read, preferably, without parallax and in which masking can be applied simply and without substantially increasing the manufacturing cost of the unit.

Briefly, masking elements are positioned between the front plate and the back plate of the electrooptical display, in such a way as to at least in part mask the optically observable effect. The masks can cover the optically observable effect, for example a constrasting image, so that the image will have a predetermined shape; or be in form of a color panel, so that zones or areas of different color can be observed. Preferably, the mask is on an optically active layer of the display and applied to the panel or plate which is close to the observer, thereby eliminating parallax effects. The mask can be applied to that side which has a continuous electrode thereon.

The arrangement has the advantage that the display zones are masked or covered in such a manner that parallax-free read-out of a display panel can be obtained. The optical effect which presents itself to the observer is improved since the read-out can be obtained from any angle which provides good visibility. The system has the additional and unexpected advantage that the connection to conductive tracks can be masked, that is, the conductive tracks can be placed within zones which are to be masked, and since the system is free from parallax, no track zones can be seen. In large area displays, it is additionally possible to provide support points which are completely invisible to the observer. The masking material itself can be applied in various ways, so that additional masking step after manufacture, and accurate alignment thereof can be eliminated.

In accordance with a preferred feature of the invention, the mask is located on the side of the electrode which is closest to the observer. This arrangement makes it possible that electrooptical effects which may obtain upon crossing of conductive tracks can be made invisible to the observer; likewise, with this arrangement, it is possible to place supporting zones which will not be visible. Masking which is precise with respect to segmental positioning can be obtained and, in accordance with a preferred feature, the mask is then applied to a continuous transparent electrode. This substantially facilitates the manufacture of LCD units, since additional operating steps can be eliminated.

The mask can be applied by a printing method which is particularly simple. If printing ink, or lacquers are used, which have a rough or structured surface, manufacture is particularly simple. The masks can be applied by other processes, as well; for example, the masks can be vapor-deposited or applied by means of photosensitive lacquers or inks, or by use of emulsions standard in the photographic field. Colored masking zones can readily be made by suitable choice of the masking materials.

DRAWING

The single FIGURE is a schematic cross-sectional view through a Twisted Nematic Liquid Crystal Display (TN-LCD) unit.

DETAILED DESCRIPTION

The invention will be described in connection with a TN-LCD unit; for simplicity, orientation and insulating layers have been omitted from the drawing, and can be used as well known. The LDC unit has a front polarizer 1 which is secured to a front glass plate 2. A continuous transparent electrode 3, known as the back-plate, is applied to the inside—with respect to the liquid crystal substance—of the glass plate 2. Masking zones 4 are located on the electrode 3. The front plate is formed by an etched electrode 5, secured to a rear glass plate 7. A liquid crystal 5 is introduced between the back-plate electrode 3 and the front-plate electrode 6, with the masking 4 on the back-plate electrode. A rear polarizer 8 closes off the unit.

A lamp 9 is located behind the LDC unit to provide for illumination thereof, if needed; the position of the observer is schematically indicated by the eye 10.

In accordance with the invention, the mask 4 is located within the LCD unit, and in the range of the liquid crystal 5. This substantially simplifies the layer of the LCD, since the shape of the segment is determined by the mask, and not merely by the position of the front-plate electrode 6. The segment which is to be addressed thus need not have the precise shape of the image which is to be conveyed; it need be shaped only such that the area behind the window of the mask is completely covered (see the FIGURE). Any symbols, for example if the LCD unit is to be used as part of a control panel, or as a dash-board indicator display for a motor vehicle, can be readily formed by suitable shaping of the mask. Such symbolic representations may, for example, be warning triangles, symbolic indications of a fuel pump to characterize a fuel indicator, or the like. These symbolic shapes can be formed by the mask and need not be formed by the shapes of the electrodes themselves. It is only necessary to provide a display surface of sufficient size.

The arrangement further permits simplification in manufacture since the back-plate electrode 3, close to the observer, on the forward glass plate 2 need not be etched. In prior art LCD units, it was necessary to so construct the common or back-plate electrode that no cross-over with segmental supply lines of the segmental electrodes occurred. In accordance with the present invention, the masking can be so arranged that as many support points as necessary, and shaped as desired, can be applied. Microspacers, thus, can be eliminated. Such microspacers were necessary, heretofore, to ensure constant thickness of the layer. The elimination of such elements permits reduction of interfering transmission components, or remainders of transmissions of the cell, when the cell is blocked. It is also not necessary to provide for anit-reflection arrangements with respect to the electrodes. The back-plate electrode 3 is not etched. Thus, differential reflection will not occur.

The unit permits manufacture with fewer working steps when making the LCD, which is particularly important in mass-production manufacture of LCD units, resulting in substantial savings in manufacturing costs, while, simultaneously, improving the optical or visual effects obtainable. The cost advantages differ with respect to the LCD manufacturing process.

Methods and processes of manufacture: The mask is applied as the last working step on the forward glass 2 or on the rear glass 7. In accordance with a preferred feature of the invention, the mask is applied to the forward glass 2, since application of the mask at that point permits masking of support posts or the like, which then will no longer be visible to the observer. Additionally, cross-overs of electrical conductive tracks will not become apparent since they will be, or can be covered by masking. Of course, it is also possible to apply the mask to the front-plate electrode, although this is not a preferred location.

According to one method of manufacture, the mask is made by a printing process. A suitable printing process, such as screen printing, offset printing, or the like, is used to apply a generally transparent mask. The windows of the mask are then colored or rendered opaque in a second working step, if it is desired to block off certain segments, or let other segments appear in color. The thickness of the applied print should, when using lacquers or varnishes with a smooth surface, not exceed about 3 micrometers, since, otherwise, it is difficult to fill the cell. Lacquers having a rough, or structured surface, can be applied with a thickness of the desired liquid crystal layer. If a rough surface printing medium is used, it may be possible to completely eliminate spacers, since the printing medium itself will have the spacing effect, the liquid crystal being positioned in the interstices between the projections defining the rough surface.

In accordance with another method, the mask is applied by vapor-deposition; if so, the portions of the LCD which are not to be masked are covered, in any suitable manner, with a lacquer, or a metal mask. After such preliminary masking, a layer is applied by vapor-deposition or by sputtering. The layer may be black, or have any other desired color.

Another method of application is to make the mask in a galvanic process. The glass 2 has already the transparent conductive layer 3 applied thereto. It is thus possible to deposit a black, opaque, or a colored masking layer electrically by any suitable galvanic process, if no electro-less method is available. Those zones which are not to be masked—similar to the previously described processes—must be covered in a suitable manner. This process, of course, is applicable only if the mask 4 is to be applied to the continuous, or back-plate electrode 3, which is the preferred side.

In accordance with another method, the mask is made by a photographic process. The glass 2 is coated with a light-sensitive coating. The light-sensitive coating is exposed to light through a mask, and then developed, so that the segmental zones become transparent. Photoresists or photo-lacquers, which, upon development, become black, are suitable; customary photographic emulsions which are poured on the glass 2, after the electrode 3 has been applied, are particularly suitable, since they are very thin, optically dense, and resistant against chemicals which are usually used in the LCD manufacture. The photo-layer, likewise, can be used as an insulating layer and as a surface orientation layer, since the carrier layer will be retained on the transparent display field.

The mask can also be applied in a combined vapor-deposition and etching process. The glass 2, after having been rendered conductive by application of the back-plate electrode 3, is coated with a black layer, for example chromium, by reactive vapor-deposition. In accordance with any customary and well-known process, the glass is then coated with photoresist, or photosensitive lacquer, exposed, and developed, so that those portions which carry information will become exposed. The black layer is then etched off from the exposed portion. If the layer used is chromium, a particularly suitable material to remove the chromium by etching is potassiumhexacyanoferrate [(K3 (FE (CN)$_6$+NaOH)].

It is also possible to show particular segments of a configuration of the LCD in a predetermined color, rather than using black, or opaque masking. Colored emulsions are suitable which, depending on the emulsion used, include light-sensitive layers which are exposed through a mask. Positive or negative processes can be used. For example, in case of a positive process, they are exposed through a mask with the color which is desired; or, in case of a negative process, they are used with a mask in complementary colors. The resulting layer will be an opaque mask with colored zones, in which the surface of a carrier material is a completely plain surface. By combining a plurality of processes to a single photographic process, it is possible to additionally save working steps in making the LCD.

Colored representation and masking is completely free of parallax. The system can be used with a single masking or, by use of masks having differently colored transmission, colored LCDs can be made, requiring only one colored layer. Multilayer thicknesses within the interior of the cell could hardly be used due to their thickness. The prior art processes to make colored LCD units by external application of a plurality of superimposed colored layers is hardly applicable to an LCD in which the masking, or colored layers are inside the unit, that is, in the space which also retains the liquid crystal material.

The FIGURE is shown somewhat expanded and exaggerated with respect to the thickness of the liquid crystal.

The invention has been described in connection with liquid crystal displays; it is, however, equally applicable to other types of displays and, thus, generally applicable to electrooptical display units, by suitable modification of the construction of the cell. Thus, the methods described can be used to make display units which are based on electrophoretic displays, electrochromic displays, electrolytic displays, plasma displays, or for use with vacuum fluorescence displays.

Various changes and modifications may be made and features described in connection with any one of the embodiments or methods may be used with any of the others, within the scope of the inventive concept.

We claim:

1. An internally-masked, parallax-free electro-optical display unit having
   a transparent front carrier plate adapted to face an observer;
   a continuous transparent front electrode layer secured to the front carrier plate at the side thereof remote from the observer;
   a rear carrier plate spaced from the front carrier plate;
   a rear electrode secured to the rear carrier plate at the side thereof facing the observer, and hence facing the front electrode;
   an electrically responsive medium filling the space between said plate and electrodes which, upon application of an electric voltage between the electrodes exhibits an optically observable effect; and
   masking means for masking selected portions of the optical effects,
   wherein, in accordance with the invention,
   the masking means comprises a developed photographic emulsion secured between said continuous transparent front electrode layer and said electrically responsive medium,
   said emulsion being developed in such a manner as to render invisible, to the observer, track zones, support points, and cross-overs between conductive tracks of said rear electrode.

2. Unit according to claim 1, wherein the mask comprises a colored photographic emulsion, which has differently colored zones.

3. Unit according to claim 1, wherein the mask is shaped to form an insulating and surface orientation layer.

4. Method of making the internally-masked, parallax-free electro-optical display unit, as claimed in claim 2,
   comprising, in accordance with the invention, the steps of
   applying a photographic color emulsion to one of said electrodes;
   exposing said emulsion through at least one selected masking pattern with light of at least one selected color; and
   developing said emulsion to form at least one color zone in accordance with the respective selected masking pattern.

* * * * *